(12) United States Patent
McJones

(10) Patent No.: US 7,347,370 B2
(45) Date of Patent: Mar. 25, 2008

(54) SELF-ALIGNING MAGNETIC READ HEAD INCORPORATING LIFT-UP DETECTION

(75) Inventor: Justin F. McJones, Rancho Palos Verdes, CA (US)

(73) Assignee: Magtek, Inc., Carson, CA (US)

(*) Notice: Subject to any disclaimer, the term of this patent is extended or adjusted under 35 U.S.C. 154(b) by 0 days.

(21) Appl. No.: 10/992,881

(22) Filed: Nov. 18, 2004

(65) Prior Publication Data

US 2005/0150955 A1    Jul. 14, 2005

Related U.S. Application Data

(60) Provisional application No. 60/523,464, filed on Nov. 18, 2003.

(51) Int. Cl.
*G06K 7/08* (2006.01)

(52) U.S. Cl. ...................... 235/449; 235/493

(58) Field of Classification Search ............... 235/449, 235/492, 493; 360/96.5, 119, 88, 121, 123, 360/2

See application file for complete search history.

(56) References Cited

U.S. PATENT DOCUMENTS

| | | | |
|---|---|---|---|
| 3,760,391 A * | 9/1973 | Wolf et al. ................ 360/88 |
| 3,899,659 A * | 8/1975 | Nakai et al. ................. 360/2 |
| 3,946,438 A * | 3/1976 | Altmann et al. ............ 360/88 |
| 4,058,843 A * | 11/1977 | Gyi ...................... 360/245.6 |
| 4,318,147 A * | 3/1982 | Nomura ................... 360/119 |
| 4,423,415 A | 12/1983 | Goldman |
| 4,476,468 A | 10/1984 | Goldman |
| 4,489,318 A | 12/1984 | Goldman |
| 4,546,352 A | 10/1985 | Goldman |
| 4,568,936 A | 2/1986 | Goldman |
| 4,630,845 A | 12/1986 | Sanner |
| 4,635,054 A | 1/1987 | Goldman |
| 4,650,978 A | 3/1987 | Hudson et al. |
| 4,689,477 A | 8/1987 | Goldman |
| 4,748,679 A | 5/1988 | Gold et al. |
| 4,785,290 A | 11/1988 | Goldman |
| 4,806,740 A | 2/1989 | Gold et al. |
| 4,807,287 A | 2/1989 | Tucker et al. |
| 4,837,426 A | 6/1989 | Pease et al. |
| 4,906,988 A | 3/1990 | Copella |
| 4,916,294 A | 4/1990 | Goldman |

(Continued)

*Primary Examiner*—Daniel Stcyr
(74) *Attorney, Agent, or Firm*—Christie, Parker & Hale, LLP.

(57) ABSTRACT

Magnetic reading head assemblies are described that enable the alignment of a magnetic reading head to a track of magnetic information on a data card. In addition, embodiments of the present invention can enable the detection of misalignments in circumstances where the elastic mounted magnetic reading head could not aligned with the card reference edge; and therefore, the track of magnetic information on the data card. One embodiment of the invention includes a magnetic reading head including at least one magnetic gap having an alignment axis and a magnetic reading head mount including a base plate. The magnetic reading head is coupled to the magnetic reading head mount, the base plate includes a reference surface substantially parallel to the alignment axis of the magnetic gap and the magnetic reading head is coupled to the magnetic reading head mount in such a way that the magnetic gap of the magnetic reading head aligns with a track of magnetic data on a data card when a length of the reference edge of the data card rests on the base plate.

24 Claims, 3 Drawing Sheets

U.S. PATENT DOCUMENTS

| | | | |
|---|---|---|---|
| 4,985,614 A | 1/1991 | Pease et al. | |
| 5,023,923 A | 6/1991 | Sanner et al. | |
| 5,099,372 A * | 3/1992 | Kadokura et al. | 360/99.01 |
| 5,128,524 A | 7/1992 | Anglin et al. | |
| 5,177,344 A | 1/1993 | Pease | |
| 5,198,645 A | 3/1993 | Martin et al. | |
| 5,206,489 A | 4/1993 | Warwick | |
| 5,216,229 A | 6/1993 | Copella et al. | |
| 5,235,166 A | 8/1993 | Fernadez | |
| 5,270,523 A * | 12/1993 | Chang et al. | 235/449 |
| 5,311,003 A | 5/1994 | Saroya | |
| 5,365,586 A | 11/1994 | Indeck et al. | |
| 5,393,966 A * | 2/1995 | Gatto et al. | 235/440 |
| 5,408,505 A | 4/1995 | Indeck et al. | |
| 5,428,683 A | 6/1995 | Indeck et al. | |
| 5,430,279 A | 7/1995 | Fernadez | |
| 5,546,462 A | 8/1996 | Indeck et al. | |
| 5,552,947 A * | 9/1996 | Nakanishi et al. | 360/291 |
| 5,587,654 A | 12/1996 | Indeck et al. | |
| 5,602,381 A | 2/1997 | Hoshino et al. | |
| 5,612,528 A | 3/1997 | Green et al. | |
| 5,616,904 A | 4/1997 | Fernadez | |
| 5,625,689 A | 4/1997 | Indeck et al. | |
| 5,647,003 A | 7/1997 | Pease | |
| RE35,599 E | 9/1997 | Pease | |
| 5,691,526 A * | 11/1997 | Evans | 235/449 |
| 5,740,244 A | 4/1998 | Indeck et al. | |
| 5,796,086 A * | 8/1998 | Gannon | 235/449 |
| 5,901,003 A | 5/1999 | Chainer et al. | |
| 5,923,019 A * | 7/1999 | Bedell et al. | 235/449 |
| 5,949,048 A * | 9/1999 | Nakamura et al. | 235/439 |
| 5,988,500 A | 11/1999 | Litman | |
| 6,487,046 B1 * | 11/2002 | Oguchi | 360/240 |

* cited by examiner

SELF-ALIGNING MAGNETIC READ HEAD INCORPORATING LIFT-UP DETECTION

CROSS-REFERENCE TO RELATED APPLICATION

This application claims priority on U.S. patent application Ser. No. 60/523,464, filed on Nov. 18, 2003, the contents of which are incorporated herein by reference in their entirety.

BACKGROUND

The present invention relates generally to magnetic stripe readers and more specifically to the mounting of magnetic reading heads.

The storage of information using magnetic stripes has become ubiquitous. One common example is a data card, which is typically a planar piece of plastic or paper that has a stripe of magnetic material located on its surface. Information can be recorded in multiple tracks on the magnetic stripe using magnetic flux transitions. Data can be read from the magnetic stripe by moving the track relative to a magnetic reading head. Misalignment between the card and the magnetic reading head can affect the ability of the magnetic reading head to accurately read the data stored on the magnetic stripe.

SUMMARY OF THE INVENTION

Embodiments of the present invention enable the alignment of a magnetic reading head to a track of magnetic information on a data card by coupling the magnetic reading head to a movable mount that includes a base plate with a reference surface. When the reference edge of a data card contacts the reference surface, the movable mount is displaced so that the reference surface sits flush against a length of the reference edge of the data card. The magnetic reading head is located relative to the base plate such that the displacement of the base plate brings the magnetic reading head into alignment with a predetermined portion of the magnetic stripe of the data card. In several embodiments, the remnant noise characteristics of the predetermined portion of the magnetic stripe can be measured and in some instances used to verify the authenticity of the data card.

One embodiment of the invention includes a magnetic reading head including at least one magnetic gap having an alignment axis and a magnetic reading head mount including a base plate. The magnetic reading head is coupled to the magnetic reading head mount, the base plate includes a reference surface substantially parallel to the alignment axis of the magnetic gap and the magnetic reading head is coupled to the magnetic reading head mount in such a way that the magnetic gap of the magnetic reading head aligns with a track of magnetic data on a data card when a length of the reference edge of the data card rests on the base plate.

In a further embodiment, the coupling of the magnetic reading head to the magnetic reading head mount accommodates displacement of the magnetic reading head. When a length of the reference edge of the data card sits flush against the reference surface of the base plate, the magnetic reading head is displaced by the data card and the magnetic gap of the magnetic reading head is positioned over the track.

Examples of the coupling can include elastical coupling, pivotal coupling, flexible coupling, use of at least one spring, use of an elastomer, use of a flexible polymer.

In yet another embodiment, the information read from the track includes data recorded on the track and information concerning the remnant noise characteristics of the magnetic materials used to construct the track.

A still further embodiment also includes a mounting support to which the magnetic reading head mounting is coupled. In addition, the magnetic reading head mounting is coupled to the mounting support in a manner that enables the magnetic reading head mounting to be displaced relative to the mounting support.

In yet another embodiment, the pressure from the reference edge of a data card on the reference surface of the base plate causes the magnetic reading head mounting to be displaced relative to the mounting support.

In a still further embodiment again, the magnetic reading head mounting is coupled to the mounting support such that contact between the reference surface of the base plate and the reference edge of a data card causes the magnetic reading head mounting to be displaced such that a length of the reference edge rests on the reference surface of the base plate.

In yet another embodiment again, the magnetic reading head mounting is elastically coupled to the mounting support. Other coupling methods can include pivotal coupling, flexible coupling, use of at least one spring, use of an elastomer and use of a flexible polymer.

DETAILED DESCRIPTION OF THE INVENTION

Figure 1:
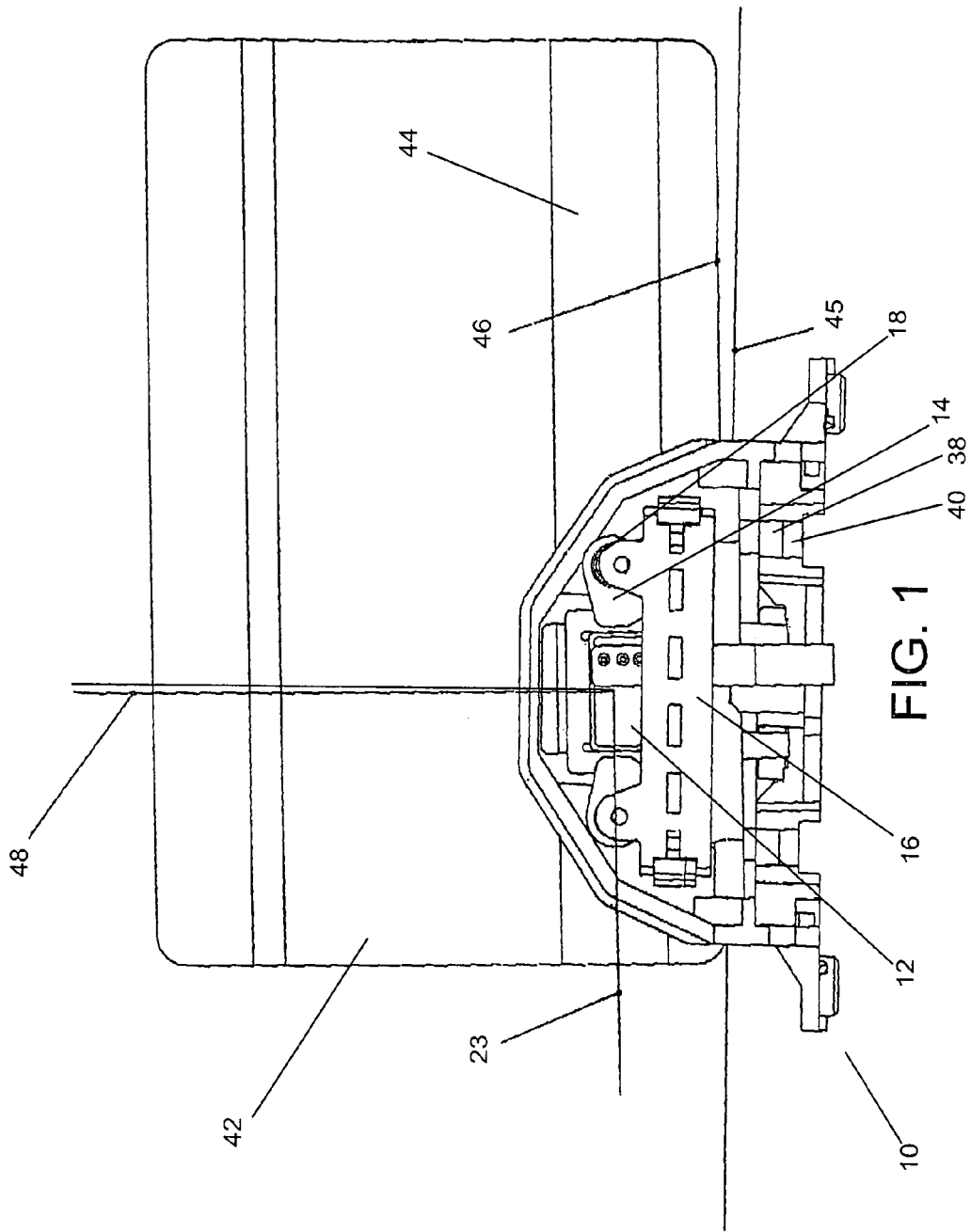
FIG. 1 is a isometric view of a magnetic reading head assembly in accordance with an embodiment of the present invention that includes a magnetic reading head mounted in accordance with the present invention that is reading data from a track of magnetic information recorded on a magnetic stripe on a data card.

Turning now to the drawings, magnetic reading head assemblies in accordance with the present invention are shown. Embodiments of magnetic reading head assemblies 10 in accordance with the present invention include magnetic reading heads 12 that are coupled to magnetic reading head mountings 14. The magnetic reading head mountings include base plates 34 that are aligned relative to the magnetic reading heads. Each base plate includes a reference surface 36 on which an edge 46 of a magnetic stripe card 42 can rest. The magnetic reading head mountings are in turn attached to mounting supports 16.

The magnetic reading head is generally coupled to the magnetic reading head mounting in a manner that allows for displacement of the magnetic reading head relative to the magnetic reading head mounting. The ability of the magnetic reading head to be displaced relative to the magnetic reading head mount can enable the magnetic reading head assembly to accommodate tilt of a data card toward or away from the magnetic reading head. In addition, the magnetic reading head mounting is attached to the mounting support in a manner allowing for movement of the magnetic reading head mounting relative to the mounting support. The ability of the magnetic reading head mounting to move relative to the mounting support enables the alignment of the reference surface of the magnetic reading head mounting base plate with the reference surface of a data card. Aligning the reference surface with the reference edge can bring the magnetic reading head into alignment with a predetermined portion of a magnetic stripe on the data card.

The base plates can also include one or more alignment indicator tabs 38. When the magnetic reading head mounting is connected to the mounting support, the magnetic reading head mounting is free to move relative to the mounting support. In one position the alignment indicator tabs cover openings 40 in the mounting support. In several embodiments, optical sources are placed on one side of the openings and optical sensors are placed on the other sides of the opening and the alignment indicator tabs break the beam of light between the source and the sensor, when the alignment indicator tabs cover the opening. In these embodiments, the detection of light by a sensor can be used to detect misalignments of the magnetic reading head relative to reader card path 45.

A magnetic reading head assembly in accordance with an embodiment of the invention is shown in FIG. 1. The magnetic reading head assembly 10 includes a magnetic reading head 12 that is coupled to a magnetic reading head mounting 14. The magnetic reading head mounting is coupled to a mounting support 16 via an elastic and/or flexible connection 18. In one embodiment, the connections are constructed using a spring. In other embodiments, the connections can be established using an elastomer or a flexible polymers. In several embodiments, the magnetic reading head 12 is capable of reading information from a magnetic stripe. In many of the embodiments, the magnetic reading head 12, the magnetic reading head mounting 14 and the mounting support are contained within the housing of a magnetic stripe card reader. In several embodiments, the mounting support is fixed to the housing of the magnetic stripe card reader.

In one embodiment, the magnetic reading head 12 is capable of capturing both data recorded on the magnetic stripe and information concerning the remnant noise characteristics of the materials used to construct the magnetic stripe (often referred to as the magnetic fingerprint of the magnetic stripe). In one embodiment, the configuration of the magnetic reading head 12, the magnetic reading head mounting 14 and the mounting support 16 and the coupling between these components is such that aligning the surface of a data card against the reference surface of the magnetic reading head mounting can bring the magnetic reading head into alignment with a predetermined portion of the magnetic stripe of the data card. In several embodiments, the remnant noise characteristics of the predetermined portion of the magnetic stripe can be used to verify the authenticity of the data card.

Figure 2:
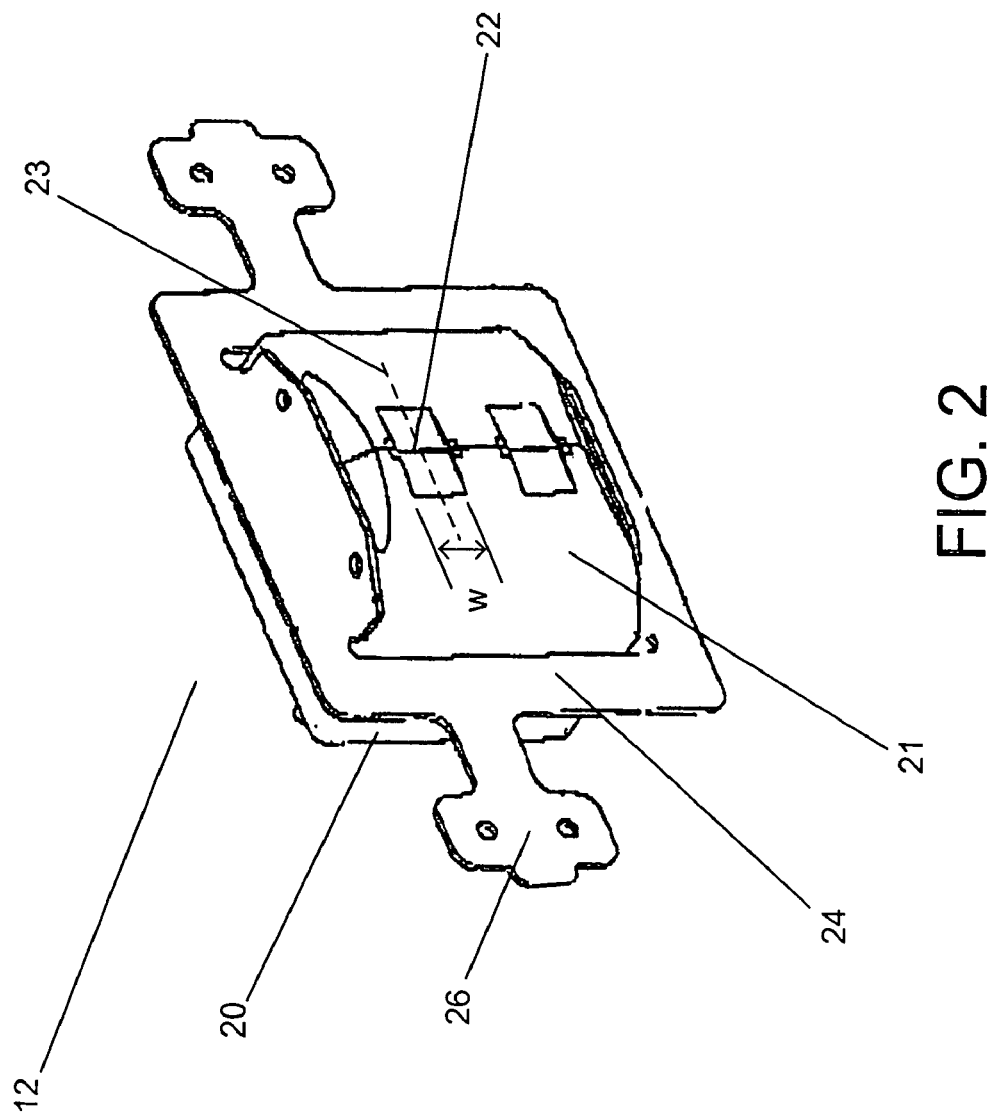
FIG. 2 is an isometric view of a magnetic reading head in accordance with an embodiment of the present invention.

A magnetic reading head in accordance with the present invention is shown in FIG. 2. The magnetic reading head includes a read head housing 20 having a read head face 21. The read head face includes at least one magnetic gap 22. Each magnetic gap defines an area for which the magnetic reading head generates electrical signals related to magnetic flux. In several embodiments, the magnetic gap is substantially rectangular with a gap width w. In addition, the gap includes a read alignment axis 23. The quality of the signal generated by the magnetic read head can be related to the alignment between the head gap and the data track on the magnetic stripe. Typically, the best electrical signal generated from a track of magnetic data recorded on a magnetic stripe occurs when the track of magnetic data is moving in a direction relative to the magnetic gap that is parallel to the alignment axis.

The magnetic read head housing shown in FIG. 2 is connected to a sensor housing mount 24 via a flexible and/or an elastic connection. In one embodiment, the connection can be maintained using springs in a manner well known to one of ordinary skill in the art for constructing magnetic reading heads. The flexible connection can enable the magnetic reading head to accommodate data cards of different thickness and the tilting of a data card toward or away from the magnetic reading head during reading. The sensor housing mount 24 includes two attachment plates 26 that enable the magnetic reading head to be attached to other structures. In other embodiments, other structures are used in conjunction with other mounting techniques.

Figure 3:
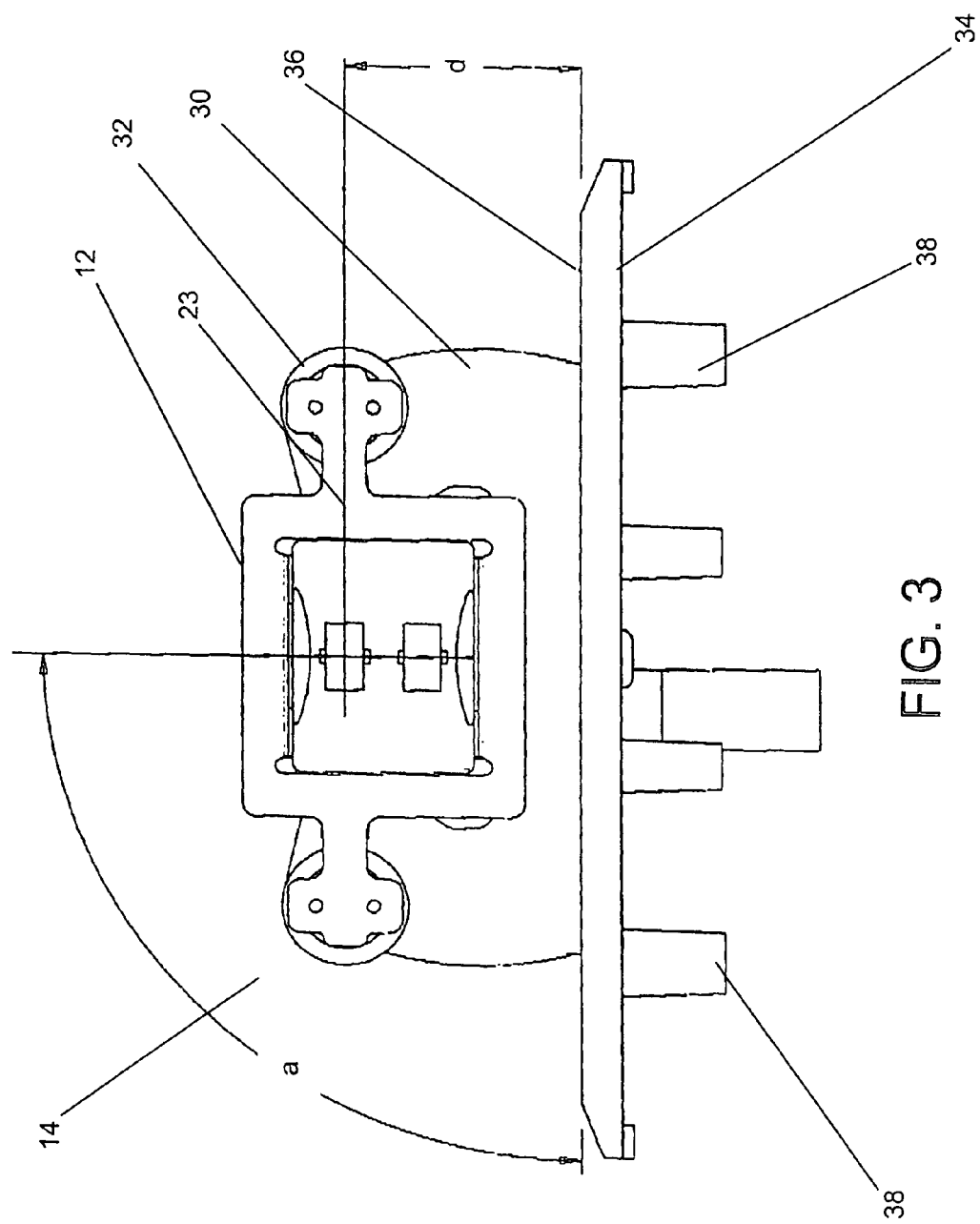
FIG. 3 is a front view of a mounted magnetic reading head in accordance with an embodiment of the present invention.

A magnetic reading head coupled to a magnetic reading head mounting in accordance with the present invention is shown in FIG. 3. The magnetic reading head mounting 14 includes a backing plate 30 to which mounting plates 32 and a base plate 34 are connected. The coupling between the magnetic reading head and the magnetic reading head mounting includes the connection between the magnetic reading head 12 and the sensor housing mount 24 and the connection between the attachment plates 24 and the sensor housing mount and the mounting plates 32 on the magnetic reading head mounting 14. The base plate includes a reference surface 36 and the attachment plates of the magnetic reading head 12 are attached to the mounting plates 32 of the magnetic reading head mounting to ensure that the alignment axis 23 of the magnetic gaps are parallel to the reference surface 36 and that the magnetic gaps are a predetermined distance d from the reference surface. The distance d can depend upon the typical distance of a track of magnetic data from the edge of a standard magnetic stripe card. In several embodiments, the base plate can also include alignment indicator tabs 38 that extend from the base plate.

Referring back to FIG. 1, the housing support 16 includes at least one opening 40. When a magnetic reading head mounting similar to the magnetic reading head mounting shown in FIG. 3 is connected as described above to the mounting support, the alignment indicator tabs extend down from the base plate but do not completely cover the opening 40. If sufficient downward pressure is exerted on the base plate of the magnetic reading head mounting, then the mounting and consequently the alignment indicator tabs are forced downward to cover the openings. Uneven pressure on the base plate can result in the alignment indicator tabs being forced downward at an angle. Depending on the extent of the angle, the alignment indicator tabs may not completely cover the opening. Appropriate dimensioning of the taps can result in the opening being covered only when the magnetic reading head mounting is aligned within acceptable tolerances to a track of magnetic data on a data card.

In operation, the magnetic reading head assembly 10 shown in FIG. 1 enables the alignment of a magnetic reading head to a data track 44 on a magnetic stripe card 40. In addition, the assembly can enable the detection of misalignment in circumstances where the magnetic reading head 12 is unable to be aligned to the data track 44. In several embodiments, the magnetic reading head assembly is located in a magnetic stripe card reader. The reader can include a wear plate 45 and the magnetic reading head assembly is positioned such that the reference surface of the base plate of the magnetic reading head mounting sits at a level that is slightly above level of the wear plate. In one embodiment, the base plate 34 is ramped at its edges to provide a smooth transition from the wear plate to the reference surface. When a card is swiped along the wear plate, the bottom or reference edge 46 of the card initially contacts the wear plate. As the data card progresses through the reader, the reference edge 46 of the card encounters the reference surface 36 of the base plate 34. The connection between the reading head mounting 14 and the mounting support 16 enables the reading head mounting to move so that the reference surface 36 conforms to the reference edge 45 of the data card 42. In this configuration, an accurate reading of the magnetic information stored on the data card can typically be made.

The movement of the reading head mounting 14 to enable the reference surface 36 to conform to the reference edge 46 of the card can cause the alignment indicator tabs 38 to cover the openings 40 in the mounting support 16. In several embodiments, an optical source (not shown) is placed on one side of the opening and an optical sensor (not shown) is placed on the other side of the opening. In these embodiments, the interruption of a beam of light from the source to the sensor by the alignment indicator tab can be detected. This information can be used to determine whether the magnetic reading head is correctly aligned relative to the track of magnetic information being read from the data card being swiped past the magnetic reading head assembly. If the alignment indicator tabs and the openings are constructed appropriately, the detection of light through the opening by the sensor at any point during the reading of data from the card is indicative of the magnetic reading head assembly being unable to correctly align the magnetic reading head relative to the track of magnetic information. Therefore, the system can choose to ignore the information obtained.

While the above description contains many specific embodiments of the invention, these should not be construed as limitations on the scope of the invention, but rather as an example of one embodiment thereof. For example, while a single track of data is described above the apparatus and methods described above are equally appropriate for use with magnetic reading heads capable of reading multiple parallel tracks of data. In addition, optical sources and sensors can be replaced by sources and sensors of other wavelengths of electromagnetic radiation provided the alignment indicator tabs are not transparent to the wavelengths of electromagnetic radiation being used. In other embodiments, mercury switches or other motion or position sensors can be used to detect movements of the baseplate that are indicative of a misalignment of the magnetic reading head. Accordingly, the scope of the invention should be determined not by the embodiments illustrated, but by the appended claims and their equivalents.

What is claimed is:

1. A magnetic reading head assembly for reading magnetic information from a track located a predetermined distance from a reference edge of a data card, comprising:
    a magnetic reading head mounting including a base plate;
    a magnetic reading head elastically coupled to the magnetic reading head mounting;
    a mounting support to which the magnetic reading head mounting is coupled,
    wherein the magnetic reading head is coupled to the magnetic reading head mounting in such a way that the magnetic reading head aligns with a predetermined portion of the track when a length of the reference edge of the data card rests on the base plate; and
    wherein the coupling between the magnetic reading head mounting and the mounting support enables the magnetic reading head mounting to move independently of the mounting support.

2. The magnetic reading head assembly of claim 1, wherein the coupling of the magnetic reading head to the magnetic reading head mounting accommodates displacement of the magnetic reading head.

3. The magnetic reading head assembly of claim 2, wherein:
    the base plate comprises a reference surface;
    the magnetic reading head comprises at least one magnetic gap;
    a length of the reference edge of the data card sits flush against the reference surface of the base plate;
    the magnetic reading head is displaced by the data card; and
    the magnetic gap of the magnetic reading head is positioned over a predetermined portion of the track.

4. The magnetic reading head assembly of claim 1, wherein the magnetic reading head is pivotally coupled to the magnetic reading head mounting.

5. The magnetic reading head assembly of claim 1, wherein the magnetic reading head is flexibly coupled to the magnetic reading head mounting.

6. The magnetic reading head assembly of claim 1, wherein the magnetic reading head is coupled to the reading head mounting using at least one spring.

7. The magnetic reading head assembly of claim 1, wherein the magnetic reading head is coupled to the magnetic reading head mounting using an elastomer.

8. The magnetic reading head assembly of claim 1, wherein the magnetic reading head is coupled to the magnetic reading head mounting using a flexible polymer.

9. The magnetic reading head assembly of claim 1, wherein the magnetic reading head mounting is elastically coupled to the mounting support.

10. The magnetic reading head assembly of claim 1, wherein the magnetic reading head mounting is pivotally coupled to the mounting support.

11. The magnetic reading head assembly of claim 1, wherein the magnetic reading head mounting is flexibly coupled to the mounting support.

12. The magnetic reading head assembly of claim 1, wherein the magnetic reading head mounting is coupled to the mounting support using at least one spring.

13. The magnetic reading head assembly of claim 1, wherein the magnetic reading head mounting is coupled to the mounting support using an elastomer.

14. The magnetic reading head assembly of claim 1, wherein the magnetic reading head mounting is coupled to the mounting support using a flexible polymer.

15. A magnetic reading head assembly for reading magnetic information from a track located a predetermined distance from a reference edge of a data card, comprising:
    a magnetic reading head including at least one magnetic gap having an alignment axis;
    a magnetic reading head mounting including a base plate;
    wherein the magnetic reading head is coupled to the magnetic reading head mounting;
    wherein the base plate includes a reference surface substantially parallel to the alignment axis of the magnetic gap;
    wherein the magnetic reading head is coupled to the magnetic reading head mounting in such a way that the magnetic gap of the magnetic reading head aligns with the track when a length of the reference edge of the data card rests on the base plate; and wherein the information read from the track includes data recorded on the track and information concerning the remnant noise characteristics of the magnetic materials used to construct the track.

16. The magnetic reading head assembly of claim 15:
wherein the coupling of the magnetic reading head to the magnetic reading head mounting accommodates displacement of the magnetic reading head.

17. The magnetic reading head assembly of claim 15, wherein pressure from the reference edge of a data card on the reference surface of the base plate causes the magnetic reading head mounting to be displaced relative to the mounting support.

18. The magnetic reading head assembly of claim 15, wherein the magnetic reading head mounting is coupled to the mounting support such that contact between the reference surface of the base plate and the reference edge of a data card causes the magnetic reading head mounting to be displaced such that a length of the reference edge rests on the reference surface of the base plate.

19. The magnetic reading head assembly of claim 15, wherein the magnetic reading head is elastically coupled to the magnetic reading head mounting.

20. The magnetic reading head assembly of claim 15, wherein the magnetic reading head is pivotally coupled to the magnetic reading head mounting.

21. The magnetic reading head assembly of claim 15, wherein the magnetic reading head is flexibly coupled to the magnetic reading head mounting.

22. The magnetic reading head assembly of claim 15, wherein the magnetic reading head is coupled to the magnetic reading head mounting using at least one spring.

23. The magnetic reading head assembly of claim 15, wherein the magnetic reading head is coupled to the reading head mounting using an elastomer.

24. The magnetic reading head assembly of claim 15, wherein the magnetic reading head is coupled to the magnetic reading head mounting using a flexible polymer.

* * * * *